United States Patent Office 3,137,330
Patented June 16, 1964

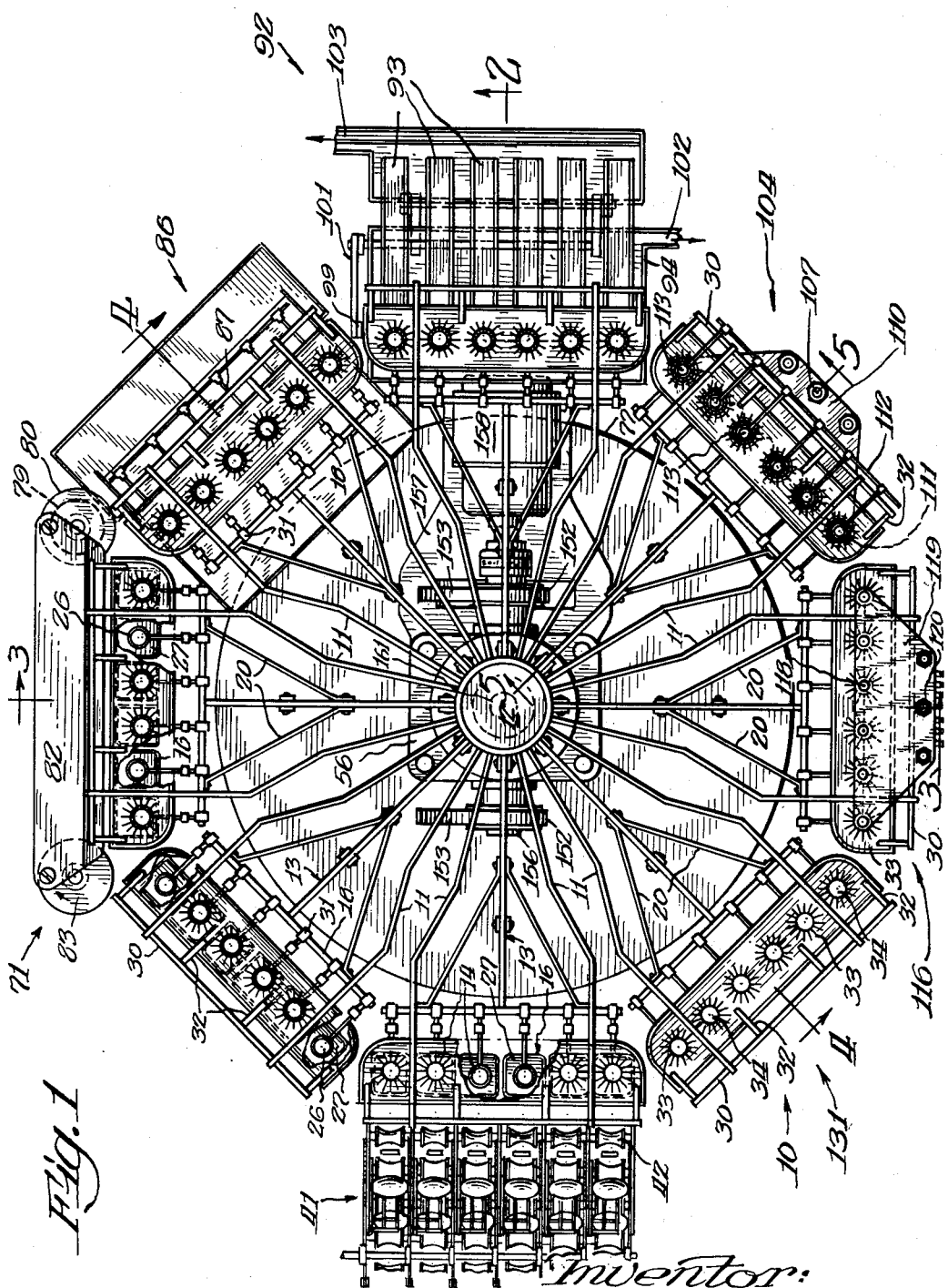

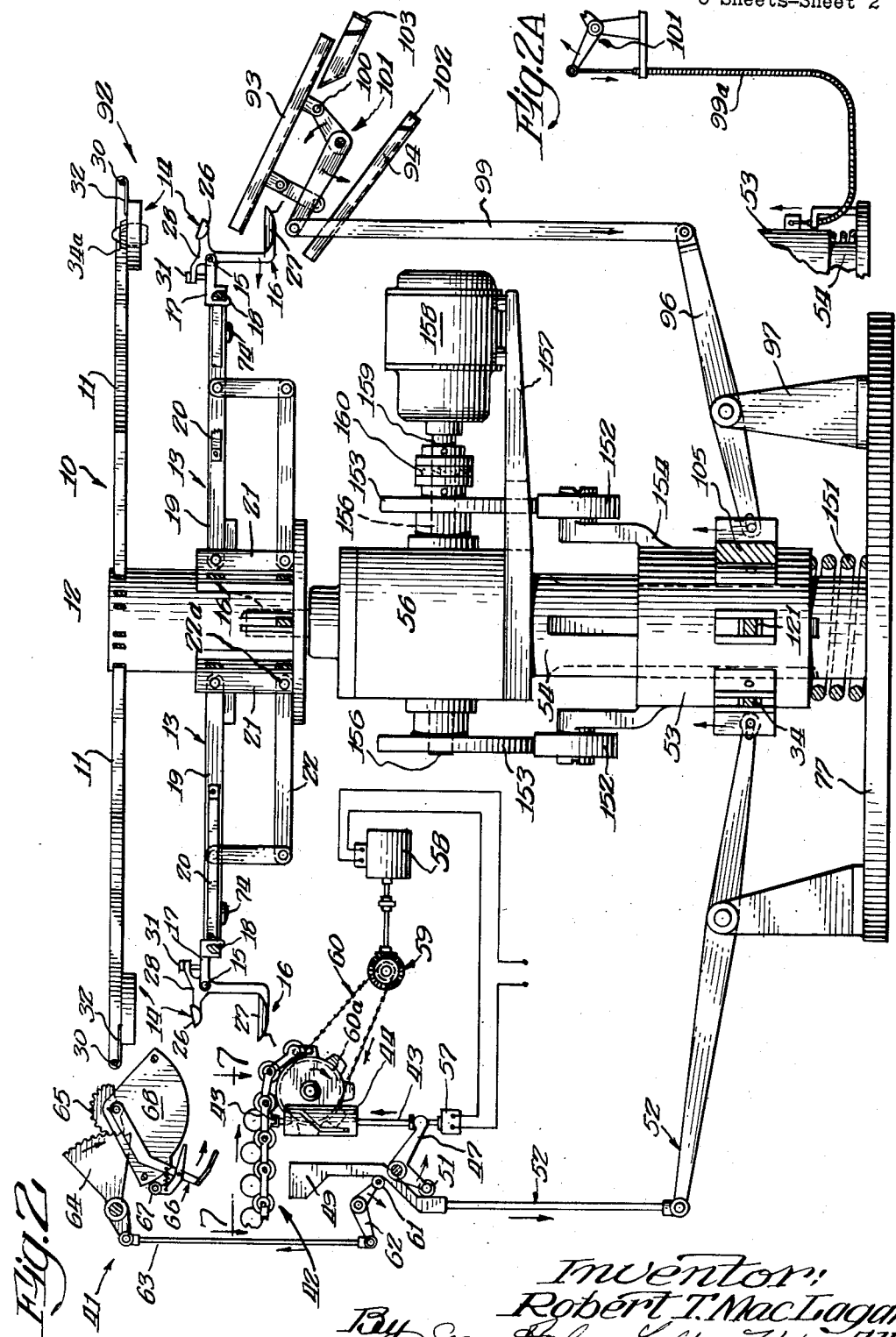

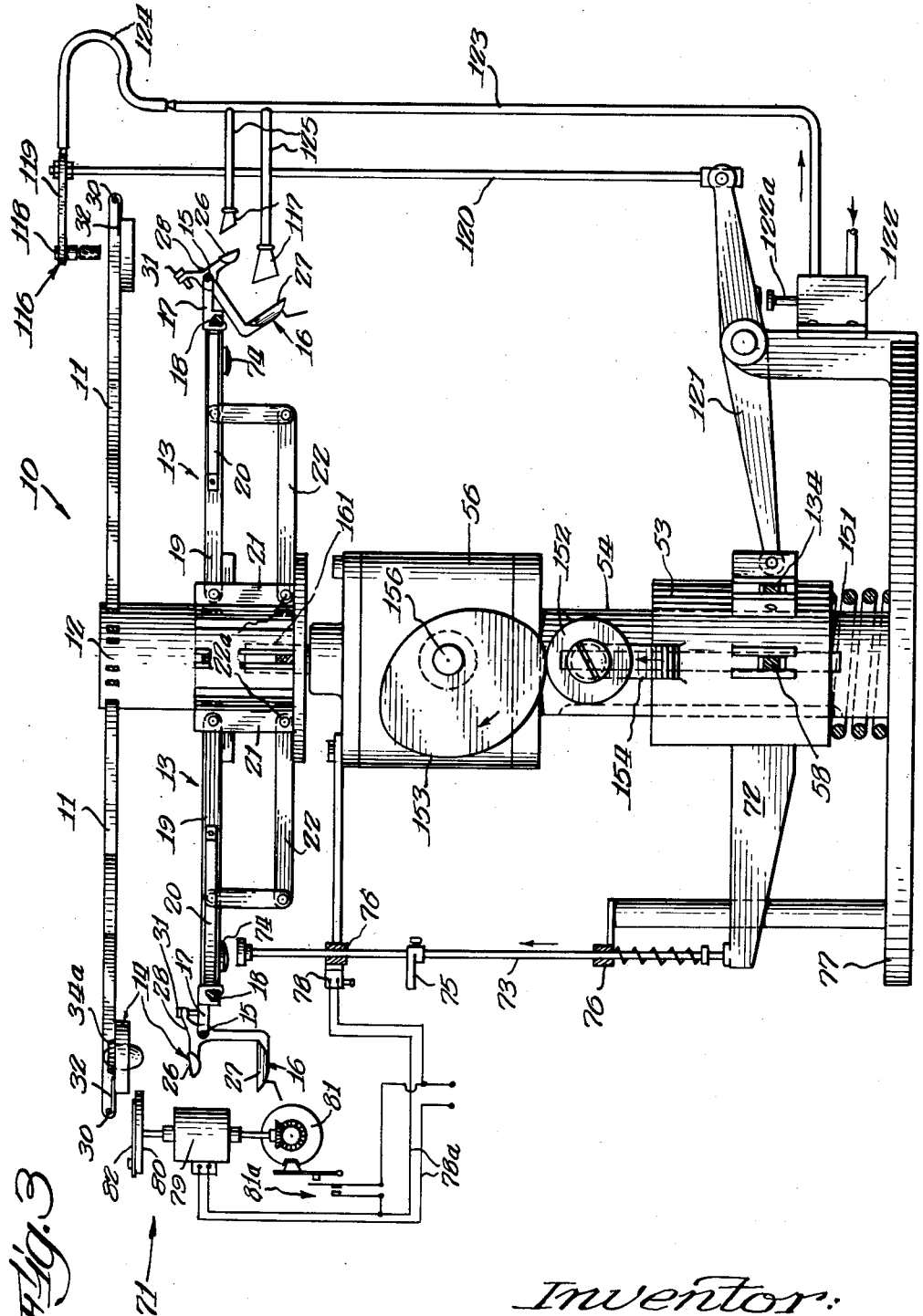

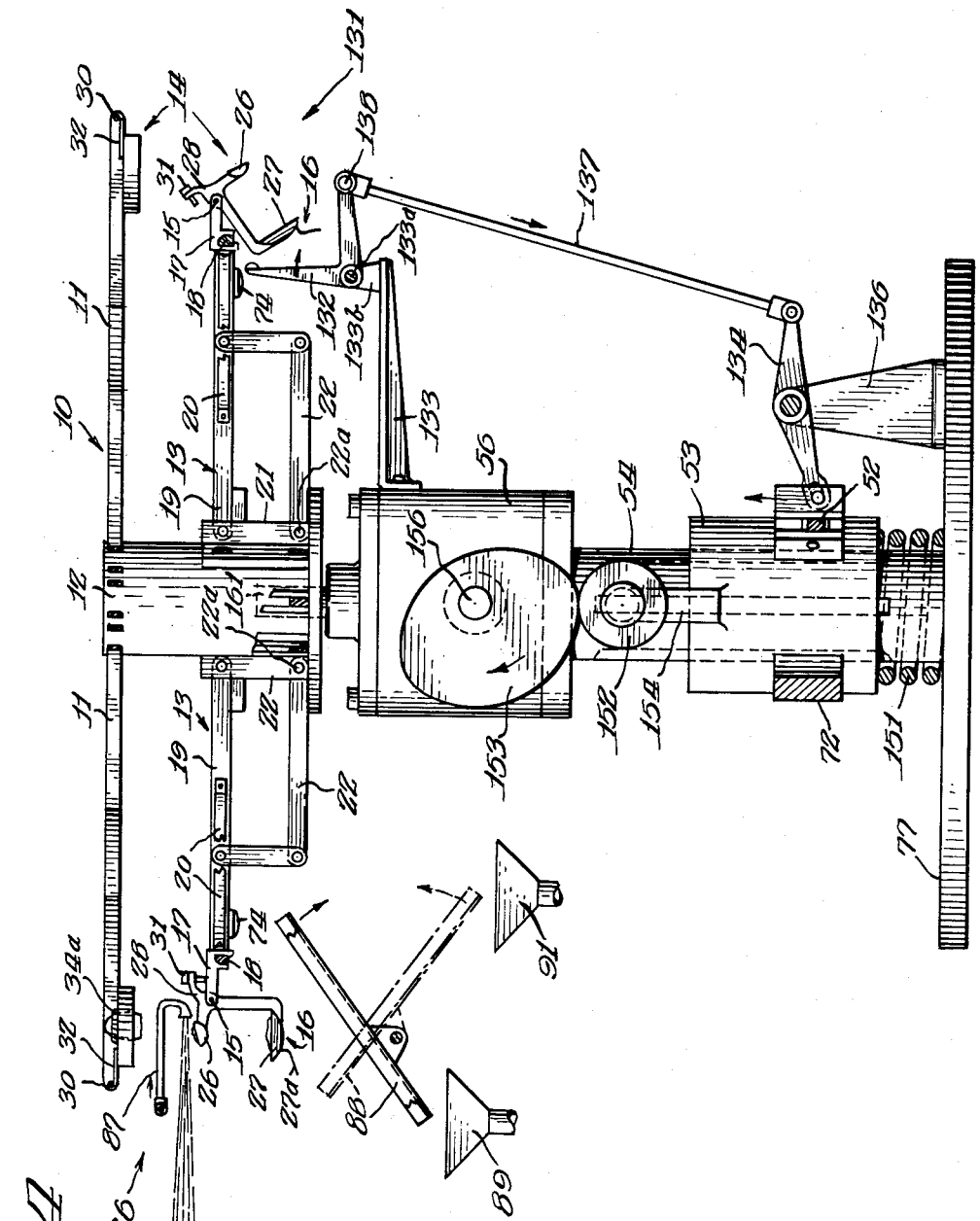

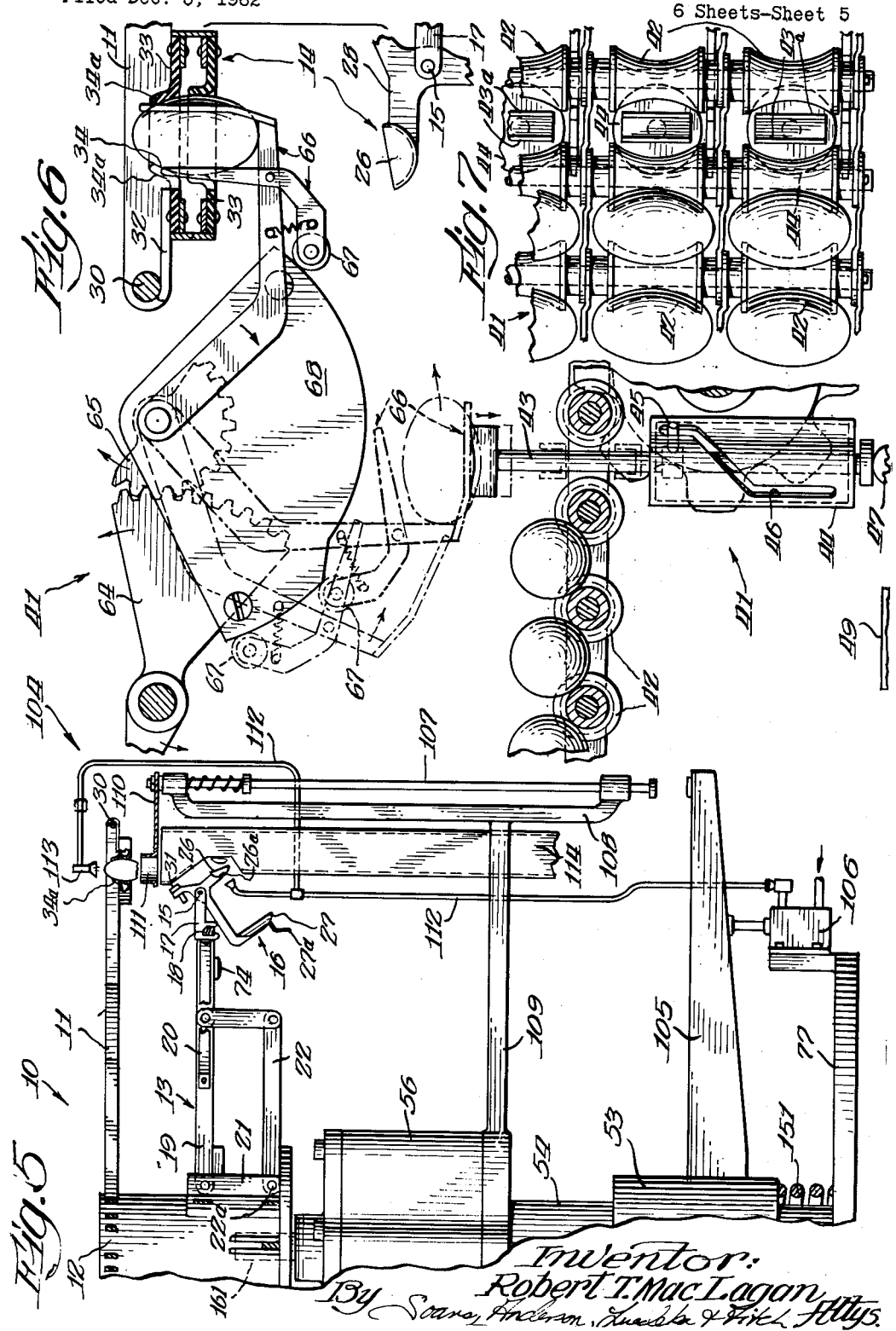

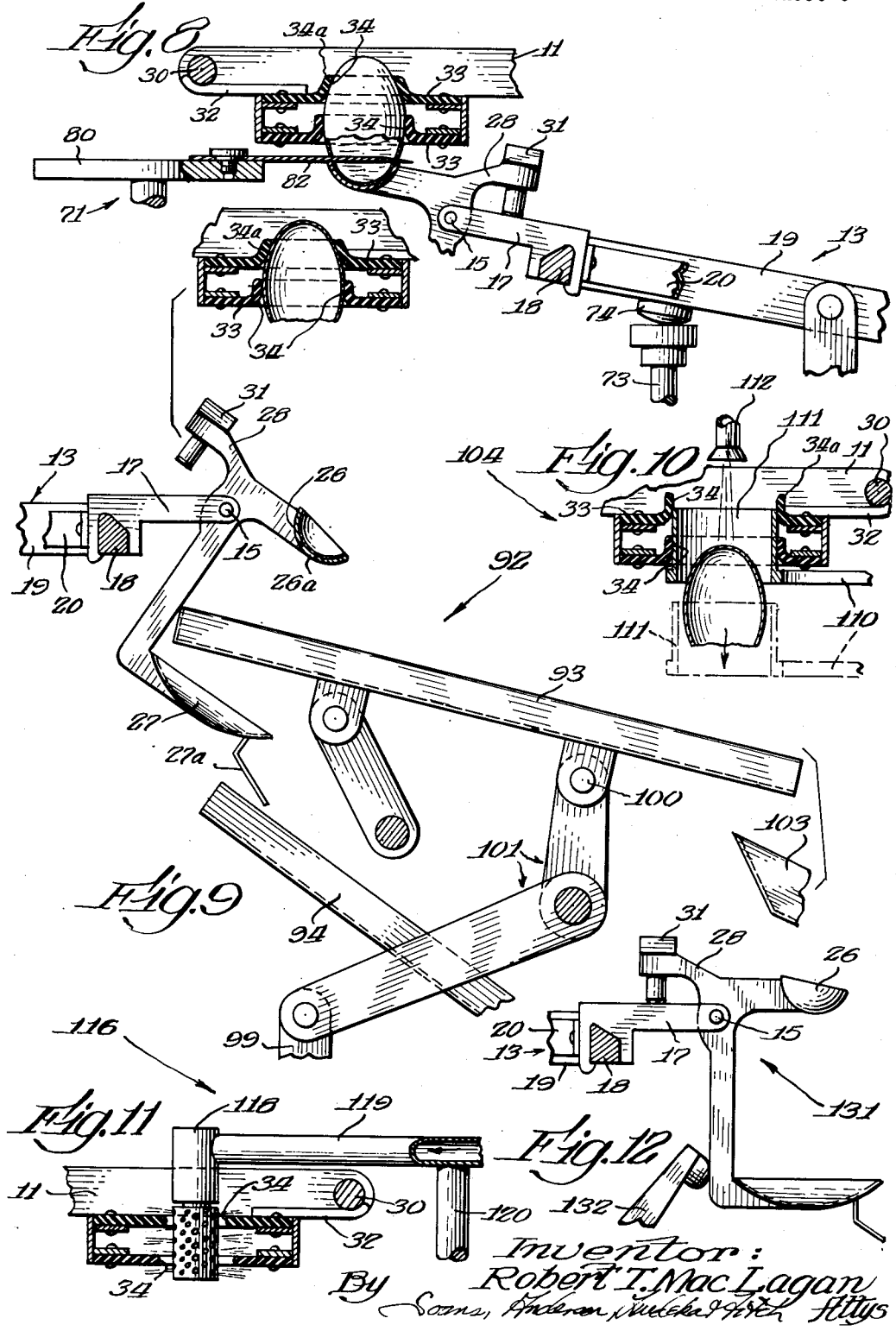

3,137,330
EGG HANDLING MACHINERY
Robert T. MacLagan, Park Forest, Ill., assignor, by mesne assignments, to Pioneers Processing Equipment, North Riverside, Ill., a corporation of Illinois
Filed Dec. 3, 1962, Ser. No. 241,938
7 Claims. (Cl. 146—2)

This invention relates to egg handling machinery and more particularly to an improved egg breaking and separating machine.

Various types of machines have been heretofore developed for effecting the breaking of eggs, the separation of the shells from the contents of the eggs and the additional separation of the yolk and albumen of each of the eggs. Various problems have arisen in connection with the use of one or more types of these previously developed machines. For example, the breaking and separating operations effected by various of these machines do not insure the recovery of substantially all of the available egg albumen without its being contaminated by portions of the yolk. In addition, several of the machines heretofore utilized for the purposes outlined above have been extremely complex and do not produce an output of broken and separated eggs commensurate with the complexity and cost thereof.

Accordingly, it is an object of the present invention to provide an improved machine for effecting the breaking of eggs, the separation of the shell portions from the contents thereof and the further separation of the yolk and albumen of each egg.

Still another object of the present invention is to provide an egg breaking and separating machine which can simultaneously effect egg breaking and separating operations on a plurality of eggs that are supplied to the machine so that an attractive product output is realized.

A further object of the present invention is to provide an improved egg breaking and separating machine which is relatively simple in operation, compact in size and relatively inexpensive both in construction and operation.

Still another object of the present invention is to provide an egg breaking and separating machine which yields substantially all of the available albumen resulting from successive egg breaking and separating operations being simultaneously performed thereby on a plurality of eggs supplied thereto.

Other objects and advantages of the present invention will become apparent from the following description when considered in conjunction with the accompanying drawings wherein:

FIGURE 1 is a plan view illustrating various features of a preferred embodiment of an egg breaking and separating machine in accordance with the present invention;

FIGURE 2 is an enlarged cross sectional view taken substantially along the line 2—2 in FIGURE 1 which illustrates a pair of the stations whereat various egg breaking and separating operations are performed by the machine;

FIGURE 2A is a fragmentary view of alternate control apparatus for use in the machine of the present invention;

FIGURE 3 is an enlarged cross sectional view taken substantially along the line 3—3 in FIGURE 1;

FIGURE 4 is an enlarged cross sectional view taken substantially along the line 4—4 in FIGURE 1;

FIGURE 5 is a fragmentary cross sectional view taken substantially along the line 5—5 in FIGURE 1;

FIGURE 6 is an enlarged fragmentary cross sectional view of egg delivery apparatus for the machine illustrated in FIGURES 1-5;

FIGURE 7 is an enlarged fragmentary cross sectional view taken along the line 7—7 in FIGURE 2;

FIGURE 8 is an enlarged fragmentary cross sectional view of egg cutting apparatus for the machine illustrated in FIGURES 1-5;

FIGURE 9 is an enlarged fragmentary cross sectional view of egg contents discharging apparatus for the machine illustrated in FIGURES 1-5;

FIGURE 10 is an enlarged fragmentary cross sectional view of egg shell ejecting apparatus for the machine illustrated in FIGURES 1-5;

FIGURE 11 is an enlarged fragmentary cross sectional view illustrating component washing instrumentalities of the machine illustrated in FIGURES 1-5; and FIGURE 12 is an enlarged fragmentary cross sectional view of egg receiving cup positioning apparatus of the machine illustrated in FIGURES 1-5.

As outlined above, the present invention is directed to an improved machine for effecting the breaking of eggs and the separation of the contents thereof. In general, a preferred embodiment of the machine includes an indexible table or support structure that is designed to receive a plurality of eggs. The indexible table or support structure is positioned so that during indexing it is advanced relative to a plurality of work stations whereat various of the operations necessary to effect the breaking and desired separation of the egg contents are carried out. The eggs to be broken and separated are supplied to the machine in preselected quantities at a first of the stations and automatically positioned on suitable receptacles provided on the table. Thereafter, as the table is indexed to and through subsequent stations, the eggs are cut, the shells are separated, the egg contents are inspected and separated from the shells and from each other, and the egg shells discharged from the machine. These various operations are effected at successive stations located about the periphery of the table so that different operations can be simultaneously performed on a plurality of eggs.

Referring in particular to the drawings, FIGURE 1 illustrates an indexible support structure, hereinafter referred to as a support table, that is generally designated by the numeral 10. The support structure or table is formed by a plurality of suitably formed diverging arm members 11 that are secured to a central supporting hub or turret 12. The table 10 also includes a plurality of arm members 13 which are also secured to the hub 12 for pivotal movement relative thereto beneath the plane of the arm members 11 as hereinafter fully described. The outwardly projecting extremities of the arm members 11 and 13 are secured to cooperating portions of a plurality of two piece egg receiving and supporting receptacles, generally designated by the numeral 14.

As shown, the two piece egg receiving and supporting receptacles 14 are secured to the arm members 11 and 13 so as to form a peripheral edge for the support table 10, which in the illustrated embodiment has the shape of a regular octagon. Accordingly, as the table 10 is indexed relative to a plurality of stations situated adjacent the edge thereof as hereinafter described, a plurality of eggs positioned within each of the receptacles have various operations performed thereon. As more fully described, the stations situated adjacent the table are designed to effect the sequential positioning of eggs within the receiving receptacles 14, the cutting of the eggs so positioned, suitable inspection operations, the separation of the egg contents, the discharge of the remaining egg shells, and the necessary cleaning of the receptacles in anticipation of a subsequent cycle of operation.

To facilitate a complete understanding of the invention as hereinafter described in detail, the structural features and operation thereof will be described in connection with the operations performed on a plurality of eggs positioned within one group of the two piece receptacles 14. That is, the successive operations performed on the eggs at the various stations will be described in connection with the indexing of the table from an initial loading station to the final station whereat the receptacles 14 are cleaned in anticipation of subsequent cycles of machine operation.

As shown in FIGURES 1 and 2, each of the two piece egg receiving and supporting receptacles 14 include an egg yolk-albumen cup 16. Each of the cups 16 is pivotally secured by a pin 15 to a projecting support element 17, a plurality of which extend outwardly from and are removably mounted on support bars 18. One support bar 18 is secured to the outer ends of each of the pivotal arm members 13. As shown, each of the pivotal arm members 13 includes a main supporting bar 19 that is pivotally secured to a cylindrical mounting member 21 and a pair of reinforcing members 20. A suitable two piece linkage 22 is secured at one extremity 22a thereof to the cylindrical mounting member 21, which is fixedly mounted about the periphery of the central hub 12, beneath supporting bar 19. The other extremity of the two piece linkage 22 is secured to the central portion of the supporting bar 19 that extends outwardly from the hub and in vertical alignment with linkage. The connection of the linkage 22 to the supporting bar 19 insures the desired guided movement of the supporting bar and the egg yolk-albumen cups 16 that are connected thereto when pivotal movement is imparted to the arm members 13 as hereinafter described.

As illustrated, the egg yolk-albumen cups 16 are essentially two layer cups including an upper egg yolk receiving portion 26 and a larger albumen receiving portion 27 that is positioned beneath the yolk receiving portion. Preferably, the yolk receiving portion 26 is a substantially paraboloidally shaped cup proportioned to accommodate the base of an egg supported in the receiving receptacle 14 and the yolk thereof after the egg has been broken. The lower albumen receiving portion 27, of each cup is essentially rectangular in shape with a curved base that is designed to accommodate the albumen derived from the eggs. The pin 15 that serves to pivotally secure each of the cups 16 to the support elements 17 extends through a relatively short apertured arm portion 28 that extends inwardly from the receiving portions of the cup toward the center of the table. As shown, each of the arm portions 28 is apertured at the extremity thereof to receive a suitable counterweight 31 that maintains the egg yolk-albumen cups 16 in an upright position beneath the primary support member for the eggs.

As previously described, each of the two piece diverging arm members 11 is secured to and extends outwardly from the central hub 12 in a plane above that of the arm members 13. In this connection, a connecting bar 30 is secured beneath the extremities of each pair of the arm members and has a plurality of supporting arms 32 extending inwardly therefrom. Each group of supporting arms 32 extending from one of the connecting bars 30 is secured to a pair of joined but spaced apart apertured egg receiving segments 33 that act as the primary support for the eggs delivered to the machine. In this connection, each of the egg receiving segments 33 (FIG. 6), which may be fabricated of any number of resilient materials such as rubber or the like, is provided with a plurality of spaced apart apertures 34 that are aligned with the apertures in the segment secured in parallel relation therewith. The apertures 34 are defined by a plurality of pliable fingers 34a that are preferably formed by cutting the resilient receiving segments with a plurality of cuts or slices that extend radially outwardly from the apertures 34 thereby allowing the apertures to be resiliently expanded. These expansible apertures 34, six of which are provided in each of the illustrated egg receiving segments 33, are designed to receive and support the eggs delivered to the machine by egg delivery or depositing apparatus generally designated by the numeral 41.

As shown in FIGS. 2, 6 and 7, the egg delivery apparatus 41 of the machine includes six egg gripping units that are concomitantly rendered effective to effect the simultaneous removal of six eggs that are delivered to the machine by a conventional six track conveyor 42 and also effect the depositing of the eggs in the expansible apertures 34. More particularly, an elongated egg engaging member 43 that includes a pair of spaced apart supporting surfaces 43a is associated with each of the egg gripping units and is positioned beneath the path of travel of the conveyor 42 so as to be vertically aligned with the eggs carried on each of the six tracks thereof. The lower extremity of the egg engaging member 43 extends through a stationarily mounted cylindrical cam track defining element 44 and has a pin 45 that is positioned within a suitably proportioned cam track 46 provided therein.

The lower extremity of the egg engaging member 43 is pinned to a bell crank 47 that is secured in a conventional manner for pivotal movement on the support structure for the machine. The bell crank 47 is positioned so that it is engaged and caused to pivot in response to the upward and downward advance of a cam 49. In this connection, the cam 49 engages a roller 51 that is secured to the extremity of the bell crank 47. The cam 49 is secured through a conventional linkage 52 to a cylindrical reciprocating member 53 that is mounted concentrically about and secured for guided movement relative to a vertical support member 54 for the machine.

A conventional indexing mechanism 56, which might be any one of several commercially available types, is coupled to the reciprocating member 53 and controls the upward and downward advance thereof in timed relation to the indexing of the support table 10 as hereinafter described. The upward and downward movement of the reciprocating member 53 imparts corresponding upward and downward movement to the cam 49 through the linkage 52. The cam 49 in turn effects the pivoting of the bell crank 47. As a consequence, the elongated engaging member 43 is advanced upwardly and downwardly relative to the element 44. This movement results in the spaced apart supporting surfaces 43a thereof being brought into engagement with an egg aligned therewith and subsequently being rotated through 90° due to the travel of the pin 45 in the cam track 46. More particularly, as the egg engaging member 43 advances upwardly through a suitably proportioned apertured portion of the conveyor track aligned therewith (FIGS. 6 and 7), the supporting surfaces 43a engage and remove the egg positioned over that portion of the conveyor so that the removed egg is ultimately positioned as shown in FIG. 6.

To insure the proper advance of eggs carried on each of the six conveyor tracks into aligned relation above the engaging members 43, the operation of the conveyor 42 is synchronized with the actuation of the engaging members. More particularly, when the bell crank 47 is in the normal position shown in FIGURE 2, a normally open switch 57 has the actuating element thereof engaged by the bell crank and the switch is closed. When closed, the switch 57 supplies energizing current from a suitable source (not shown) to a conventional drive motor 58. The driven shaft of the motor 58 is drivingly connected through a conventional gearing arrangement 59 to a chain-sprocket drive 60 for the conveyor 42. Accordingly, when the switch 57 is closed and energizing current is supplied to the motor 58, the chain-sprocket drive 60 is rendered effective. As shown in FIGURE 2, one of the sprockets 60a of the chain-sprocket drive 60 is linked directly to the conveyor 42 so that the six tracks of the conveyor are simultaneously advanced only during the intervals when the bell crank 47 engages the switch 57. In this connection, the speed of the motor 58 is selected so that the six tracks of the conveyor are each advanced only a sufficient distance to align successive eggs with the engaging members 43 after the engaging member has returned to a rest position as controlled by the reciprocating member 53 under the influence of the indexing mechanism 56.

The oppositely disposed surface of the cam 49 has a portion thereof formed in a manner similar to the surface that engages the roller 51. In this connection, a roller 61 is secured to one end of a bell crank 62 that is pivotally mounted on the machine support structure. The other end of the bell crank 62 is secured to a rod 63 that extends upwardly beyond and out of the path of travel of the six track conveyor 42 so as not to obstruct the egg delivery advance of the conveyor. The rod 63 is secured at its upper extremity to a pivotally mounted sector gear 64 that meshes with a toothed wheel 65 (FIG. 6). The toothed wheel 65 is in turn secured to a pair of pivotally connected, spring biased gripping members or bifurcated fingers 66. The uppermost finger 66 has a roller element 67 mounted thereon in engagement with a stationary cam member 68.

Accordingly, the upward advance of the cam 49, as previously described, also effects rotation of the toothed wheel 65 through the actuation of the members 61, 62, 63 and 64. As a result, the bifurcated fingers 66 are caused to advance in an arc that passes through the region between the spaced apart portions 43a of the egg engaging member 43. This arcuate movement of the gripping fingers 66 is delayed with respect to the movement of the member 43 so that the lowermost finger 66 engages the egg that has previously been raised and rotated above the conveyor. Simultaneously, the upper finger is caused to pivot in response to the advance of the roller 67 across the cam 68 and the egg is positively gripped by the fingers.

The limited arcuate advance of the gripping fingers 66 with the egg positioned therein is terminated after the fingers and the egg gripped thereby have been swung into the corresponding aligned apertures 34 provided in the spaced apart flexible egg supporting segments 33. Although the segmented region about the apertures 34 is flexible, the pliable fingers 34a are sufficiently strong to fixedly maintain the egg therein and allow the bifurcated fingers 66 to be readily withdrawn from engagement therewith upon reverse movement of the reciprocating member 53. In the manner described above, six eggs are simultaneously removed from the conveyor 42 and positioned within the aligned supporting apertures 34 provided in the egg supporting segments 33.

Although the foregoing description of the egg delivery apparatus 41 and the conveyor 42 has been directed in particular to a multi-track conveyor wherefrom a plurality of eggs are simultaneously removed, rotated and advanced into the apertures 34 of the egg supporting segments 33, it is possible that alternate forms of apparatus could also be utilized at the egg loading station. For example, the eggs could be advanced on the six track conveyor with their lengthwise axes aligned with the direction of travel of the conveyor so that it would not be necessary to rotate the eggs prior to their positioning by the gripping members 66. Similarly, rather than utilizing a six track chain conveyor, a plurality of aligned wormlike members could be employed to effect the incremental advance of eggs to the loading station.

Following the positioning of the eggs within the supporting segments 33, the indexing mechanism 56 effects the indexing of the table 10 to the next station. In the illustrated embodiment, this next station is an idle station whereat no physical operation is performed on the eggs. However, this station may be used as a checking station to insure that the eggs are positively positioned within the expansible apertures 34 of the support segments 33. The subsequent indexing cycle of the machine under the control of the indexing mechanism 56 advances the eggs to a cutting station, which is generally designated by the numeral 71 in FIGURE 3.

As herein after described in detail, the indexing mechanism 56 effects the afore-described indexing during the initial portion of the cycle and causes the reciprocating member 53 to be advanced upwardly and downwardly during the remaining portion of the cycle. In this connection, after the eggs have been indexed to the cutting station, the reciprocating member 53 is advanced upwardly thereby carrying an outwardly projecting support arm 72 therewith. The support arm is fixedly secured to the member 53 at the inner extremity thereof, and a pusher rod 73 is secured to the outer end of the arm. Accordingly, as the arm is carried upwardly, the pusher rod 73 is advanced into engagement with a stop element 74 that is secured to the lower extremity of the supporting bar 19 of the arm member 13. The substantialy vertical movement of the pusher rod 73 into engagement with the stop element 74 is insured by a pair of guide members 76, one of which extends outwardly from the housing for the indexing mechanism 56 and the other of which is secured to a base plate 77 for the machine.

The upward advance of the pusher rod 73, after engaging the element 74, causes the arm member 13 to be pivoted relative to the hub 12. This pivoting of the arm member 13 advances the yolk receiving portion 26 of each of the egg yolk-albumen cups 16 mounted thereon into alignment and close proximity with the lower extremity of the eggs aligned therewith and confined within the expansible apertures 34 of the egg supporting segments 33.

As the upward advance of the support arm 72 is completed, a switch actuating member 75 secured to rod 73 engages the actuating element of a motor actuating switch 78 that is mounted on the upper guide member 76. The switch 78 is connected in a conventional manner through conductors 78a to a motor 79 and serves to supply energizing current to the motor from a suitable source (not shown) when in an actuated state.

More particularly, when the actuating element of the switch 78 is engaged by the actuating member 75 this switch is instantaneously closed to render the motor 79 effective. The drive shaft of the motor 79 is connected at one extremity to a substantially circular cutting blade support plate 80 and at the other extremity to a suitable bevel gear arrangement that drives a switch actuating cam member 81. The cam member 81, when driven by the motor 79, causes the actuating element of a normally open switch 81a to effect the closure of the switch thereby shunting the switching 78 which only remains energized for a short period of time. Accordingly, as the cam member 81 makes one revolution under the influence of the motor 79, the switch 81a is closed to insure a supply of energizing current to the motor during this interval.

The rotation of the cam member 81 is effected simultaneously with the rotation of the circular support plate 80. As shown in FIGURES 1, 3 and 8, a relatively thin trapezoidally shaped cutter blade 82 is eccentrically mounted on the motor driven support plate 80 and a second support plate 83 which is rotatably mounted on the support structure for the machine. The rotary motion imparted to the support plate 80 causes the blade 82 to be advanced inwardly toward the central axis of the table 10 and into cutting engagement with the portions of the eggs that extend downwardly beneath the egg supporting segments 33. A substantially uniform path of travel of the cutter blade 82 into engagement with the eggs is insured by the mounting thereof both on the motor driven plate 80 and the plate 83 which acts as a follower to the plate 80. Each of the eggs which is engaged by the blade 82 has the lower portion thereof completely severed from the upper portion retained within the egg receiving apertures 34. However, this lower portion of each of the eggs remains cradled in the yolk receiving portion 26 of the corresponding egg yolk-albumen cups 16 that have been advanced upwardly into alignment therewith as previously described.

The motor 79 which controls the simultaneous severance of six eggs confined within the apertures 34 of the supporting segments 33 drives the cutter blade 82 at a relatively high speed so that this cutting operation is completed prior to the time that the downward advance of the reciprocating member 53 is initiated. The motor 79 is cut off when the switch actuating cam 81 has finished one complete revolution. In this connection, the actuating element of the switch 81a becomes positioned in the cut away portion of the cam member 81 to allow the switch to become open thereby cutting off energizing current to the motor. The motor 79, which may be any one of several commercially available types, preferably incorporates a self-damping or braking feature so that the cutting blade 82 is stopped after effecting the aforedescribed cutting operation.

The downward advance of the reciprocating member 53 results in the support arm 72 being returned to the normal idle position as shown in FIG. 3. As a consequence, the lower portions of the severed eggs that are cradled within the yolk receiving portions 26 of each of the cups 16 are advanced downwardly, and the yolk is deposited in the lower severed portion of the egg shell confined in the cup 16. Simultaneously, the albumen spills from the portions of the shells confined within the apertures 34 and passes over the yolk receiving portion of the cups 16 positioned therebelow and into the albumen receiving portions 27 thereof. Although the cups 16 now retain the separated contents of the six eggs, this additional weight in each cup is not sufficient to cause a pivoting thereof and the counterweight 31 holds the cups in an upright position.

After the cutting of the eggs, the separation of the contents thereof, and the downward movement of the reciprocating member 53 are complete, the table 10 is again indexed through 45°. The now separated egg contents contained in each of the cups 16 are thereby delivered to an inspection station generally designated by the numeral 86 (FIG. 4). When the table 10 is brought to a stop at the inspection station 86, each of the yolk containing portions 26 of the cups 16 is positioned in alignment with a nozzle 87 that has air selectively discharged therefrom. The air stream from the nozzles 87, which is directed above the yolks contained in each yolk receiving portion 26, allows an operator to determine if any of the separated eggs of the group presented to the inspection station 86 are rotten. In this connection, an operator at the station 86 preferably actuates suitable control means (not shown) to effect the delivery of the air supply to the nozzles 87.

It should be understood that suitable sensing devices are commercially available which effect the automatic detection of rotten eggs and such a unit could be readily employed with the machine of the present invention. For purposes of descripiton, however, it will be assumed that one or more of the machines of the present invention are manned by an operator who makes the determination as to egg condition by a visual and nasal inspection. In this connection, an operator at the station 86 also determines if any of the yolks have been broken during the cutting or separating operations effected at the station 71. If the operator should find that one or more of the eggs is rotten or should determine that one or more yolks have been broken (thereby contaminating the albumen within the lower portion of the cup) he selectively ejects the contents of the cup or cups containing same.

To facilitate this ejection of rotten and/or broken eggs, a two position trough 88 is provided below each of the cups 16 at the inspection station 86. The troughs 88 are preferably pivotally mounted on a portion of the machine support structure so that each can be selectively positioned to communicate with either of a pair of discharge chutes 89 or 91. More particularly, if the inspection by the operator yields an indication of a rotten egg within one of the cups 16, the trough 88 is pivoted to the position shown in FIGURE 4. The cup is manually tilted by the operator depressing a handle 27a on the appropriate cup thereby discharging the rotten egg to the waste chute 89.

If it is determined that one of the egg yolks has become broken and the albumen contaminated thereby, the trough 88 is positioned as shown in dotted outline in communication with the salvage chute 91, and the cup containing the broken egg is manually tilted to discharge the mixed contents thereto. Any mixed eggs thus discharged from the machine are preferably collected and sold in that condition. To enhance the sanitary nature of the machine operation, each of the cups 16 is preferably removably positioned on the support bar 18. Accordingly, after the contents have been dumped from a cup, it is removed from the machine and replaced by a clean cup.

Subsequent to the completion of the inspection operations at the station 86, the indexing mechanism 56 again effects the advance of the table 10 through 45°. This indexing of the table delivers the separated eggs to a discharge station, generally designated by the numeral 92 (FIG. 2), whereat the separated yolk and albumen carried in each of the cups 16 are separately discharged to suitable containers in anticipation of subsequent treatment and/or packaging.

More particularly, when the table 10 has been advanced to the discharge station 92 the six cups 16 are positioned above troughs 93 and 94. The trough 93 is preferably a multichannel member that is movably mounted on the machine support structure so that the individual channel defining members thereof can be simultaneously advanced into engagement with the cups 16 by the upward advance of the reciprocating member 53. In this connection, a rocker arm or lever 96 is pivotally secured on a support member 97 that is mounted on and extends upwardly from the base plate 77. As shown, the inner extremity of the rocker arm 96 is secured to a projecting coupling member extending from the reciprocating member 53. The other end of the rocker arm 96 is connected, in a conventional manner, through a suitable linkage 99 to a two piece lever arrangement 101. The two piece lever arrangement 101 is pivotally mounted on a portion of the machine support structure and is connected to a connecting member 100 that is secured to and joins each of the individual channels to form a unitary trough structure.

The linkage 99 and lever arrangement 101 are connected together so that the downward advance of the linkage 99 in response to the upward advance of the reciprocating member 53 causes the individual channel members of the movable trough 93 to be brought into engagement with the segments of the cups 16 that connect the yolk receiving portion to the lower albumen receiving portion. As a consequence, a clockwise pivoting of the cups 16 is effected resulting in the yolks confined therein being discharged into the channel of the movable trough 93 aligned therewith and the albumen being discharged into the lower stationary trough 94 (FIG. 9). Not only does this movement of the upper trough 93 cause a pivoting of the cup 16, but it also severs any albumen strains that may be extending downwardly from the yolk receiving portions 26 of the cups thereby insuring that the maximum available albumen is collected by the trough 94.

The movable trough 93 is returned to the initial position shown in FIG. 2 by the downward movement of the reciprocating member 53. However, the counterweights 31 preclude the cups 16 from returning to their normal upright position, and the lowered severed portion of the egg shells are retained in the yolk receiving portions 26 of each of the tilted cups. As shown in the plan view of FIGURE 1, the trough 94 communicates with an albumen collecting chute 102 and the trough 93 communicates with a similar yolk collecting chute 103.

The pivoting of a selected group of cups 16 at the station 92 can also be effected through the use of a slideable cable arrangement 99a shown in FIG. 2 rather than the linkage 99. When the cable arrangement is employed, the movement of the reciprocating member 53 is translated directly into a corresponding movement of the lever arrangement 101 to cause the automatic tipping of the cups. In certain applications, it may also be desirable to employ a tray mounted on the machine support structure between the cutting station and the discharging station. This auxiliary tray is employed to catch any albumen that drops from the yolk receiving portion of the cups 16 and which may be contaminated due to its contacting the portion of the egg shell confined therein. With the employment of such a tray it may also be desirable to maintain the troughs 93 and 94 in a stationary position and effect the tilting or dumping of the cups by a member that is advanced directly into engagement therewith in response to the movement of the reciprocating member 53.

After the contents of the cups 16 have been discharged, the table 10 is again indexed through 45° and the group of cups 16 is presented to a shell ejecting station generally designated by the numeral 104 (FIG. 5). At this station, the upper portion of the egg shell confined within the apertures 34 in the egg supporting segments 33 are ejected (FIG. 10) simultaneously with the ejection of the lower portion of the egg shell within the yolk receiving portion 26 of each of the cups.

In this connection, an arm 105 is secured to and extends outwardly from the reciprocating member 53. When in the rest position shown in FIG. 5, the arm 105 engages the actuating element of an air valve 106 and has the outer extremity thereof aligned with a spring biased pusher rod 107 that extends through a guide member 108. The guide member 108 is mounted on a support bracket 109 that is secured to and extends outwardly from the housing for the indexing mechanism 56.

An irregularly shaped support plate 110 (FIG. 1) is secured to the upper extremity of the pusher rod 107 and extends inwardly toward the center of the support table 10 beneath the path of travel of the egg supporting segments 33. The plate 110 has a plurality of hollow cylindrical cup-like members 111 secured thereto so as to extend upwardly therefrom. The cup-like members 111 are suitably proportioned and positioned in spaced relation so that upward movement of the plate 110 causes the cuplike members to advance into engagement with the pliable fingers 34a that define the apertures 34 wherein the upper portions of the egg shells are confined. As shown, this upward advance of the plate 110 is effected by the upward advance of the arm 105 in response to reciprocation of the member 53.

As the hollow cup-like members 111 engage the pliable fingers, the egg shell confining apertures 34 defined thereby are caused to expand thereby releasing the shells (FIG. 10). Simultaneously with this release of the upper portion of the egg shells, a blast of air is directed at each of the apertures 34 and at the yolk receiving portion 26 of each of the cups 16 through a small opening 26a provided in the base thereof.

More particularly, when the arm 105 is advanced upwardly, the air valve 106 is opened to supply air from a suitable source (not shown) through conduit members 112 to a plurality of nozzles 113. One each of the nozzles 113 is aligned with each of the small apertures 26a in the base of the yolk receiving portion 26 when in the tilted position and with each of the apertures 34. Accordingly, air supplied through the nozzles 113 blows the lower portions of the egg shells from the cups 16 and insures that the upper portion of the shells are released from the apertures 34. The shells thus ejected fall into a discharge chute 114 that is mounted on the machine support structure.

Subsequent to the shell ejection, the indexing mechanism 56 advances the table 10 through another 45° increment thereby aligning the group of egg receiving receptacles with suitable washing instrumentalities at a washing station, generally designated by the numeral 116 (FIG. 3). More particularly, when the two piece egg receiving receptacles 14 are advanced to the washing station 116, the upper and lower portions 26 and 27 of each of the cups 16 are aligned with water discharge nozzles 117. Similarly, a cylindrical water discharge nozzle 118 is positioned above each of the egg receiving apertures 34 of the egg supporting segments 33.

As shown in FIGURE 3, each of the cylindrical discharge nozzles 118 is mounted on and extends downwardly from a support plate 119 having a configuration similar to that of the plate 110. The support plate 119 has a plurality of channels (not shown) provided therein that communicate with each of the nozzles 118. In addition, the plate 119 is secured to a rod 120 that is connected to a pivotally mounted rocker arm 121, which is structurally and functionally similar to rocker arm 96 at the station 92. More particularly, the rocker arm 121 is pivoted by the upward advance of the reciprocating member 53 thereby causing the rod 120 to be advanced downwardly bringing the nozzles 118 into the apertures 34 provided in the spaced apart flexible egg supporting segments 33.

The downward advance of the rocker arm 121 brings the end of the arm into engagement with the actuating member 122a of a water supply valve 122. Accordingly, water is supplied through six conduit members 123 from a suitable source (not shown). The conduit members 123 are connected through six flexible hose members 124 to the channels in the support plate 119 that communicate with the nozzles 118. In addition, the conduit members are connected through six dual piping arrangements 125 that communicate with the nozzles 117.

Accordingly, water supplied through the valve 122 is simultaneously discharged by the nozzles 117 and 118 (FIG. 11) thereby effecting a cleaning of both the upper and lower portions 26 and 27 of the cups 16 and the pliable fingers 34a that define the expansible apertures 34. It should be understood that this washing operation can be done by manual operation with only selected ones of the cups being washed; however, the automatic washing of each of the cups and the apertured egg supporting regions is preferable.

Six of the two piece egg receiving receptacles 14 that form one of the eight groups provided by the machine have been heretofore described during the advancement thereof to and through seven of the eight stations whereat the aforedescribed operations are successively effected. The last station generally designated by the numeral 131 (FIG. 4) is essentially an idle station whereat the cleanliness of the cups 16 is verified and whereat the upright positioning of the cups is effected.

In this connection, a plurality of bell cranks 132 are pivotally mounted on a support bracket 133 by a plurality of mounting pins 133a that extend through each of a plurality of upwardly projecting mounting members 133b provided by the support bracket. One each of the bell cranks 132 is mounted so as to be aligned with each of the lower albumen receiving portions 27 of the cups 16. When the bell cranks 132 are caused to pivot in a clockwise direction, each of the cups 16 is returned to its normal upright position whereat it is maintained by the counterweights 31.

In this regard, a suitable lever 134 is secured at one extremity thereof to a coupling element that extends outwardly from the reciprocating member 53 and is pivotally mounted on a support member 136. The other end of the lever 134 is secured to a push rod 137 that is connected at the upper end thereof to a shaft 138. The shaft 138 is secured to and passes through the outwardly extending ends of each of the bell cranks 132. Accordingly, the downward advance of the push rod 137 in response to the upward advance of the reciprocating member 53 causes the free ends of the bell cranks to be pivoted into engagement with the cup 16 aligned therewith (FIG. 12) to effect the simultaneous pivoting of the cups 16 to an upright position. Thereafter, this group of cleaned and repositioned cups is indexed to the loading station and the cycle is perpetuated.

The foregoing description of the structural features of the illustrated embodiment of the egg breaking and separating machine has made reference to the indexing mechanism 56 and the reciprocating member 53 which is actuated thereby. The detailed manner in which the indexing mechanism 56 effects the actuation of the reciprocating member 53, as previously described, will best be understood from a consideration of FIGURES 2, 3 and 4.

As shown in the drawings, the reciprocating member 53 is concentrically mounted about the vertical support member 54 that extends upwardly from the base 77 of the machine. A conventional spring member 151 is concentrically mounted about the periphery of the vertical support member 54 and between the lower extremity of the reciprocating member 53 and the upper surface of the base 77. The spring member 151 imparts an upward force to the reciprocating member 53 so that a pair of cam followers 152 that are mounted on projecting portions 154 thereof are maintained in positive contact with a pair of irregularly shaped cams 153. The cams 153 are mounted on a common shaft 156 of the indexing mechanism 56.

As shown in FIGURE 2, a motor support bracket 157 extends outwardly from the lower portion of the housing for the indexing mechanism 56. A conventional drive motor 158 is mounted near the outer edge of the support bracket 157 and has the drive shaft 159 thereof connected through a coupling element 160 to the shaft 156 of the indexing mechanism whereon the cams 153 are mounted. In a conventional manner, the motor 158 drives the indexing mechanism thereby effecting the rotation of the cams 153.

In this connection, the irregular configuration of the cams is such that the reciprocating member 53 has upward and downward movement imparted thereto only during a portion of the rotational cycle of the cams. More particularly, the motor drives the indexing mechanism so that a shaft 161 which is secured to the hub or turret 12 is rotated through increments of 45° by the indexing mechanism during each cycle of operation thereof. During the indexing interval (i.e. preferably during the initial 120° of cam rotation), the cams 153 rotate relative to the rollers 152 but preclude any substantial upward advance of the reciprocating member 53. As the 45° indexing interval of the table is terminated, the cam surface then exposed to the rollers 152 allows the reciprocating member to be advanced upwardly. More particularly, the spring member 151 causes the reciprocating member to be advanced upwardly until the cam members 153 have completed approximately 240° of rotation. Thereafter, the continued rotation of the cam members 153 forces the reciprocating member 53 to return to a normal position against the action of the spring member. When the reciprocating member has been returned to this normal position, the next indexing cycle is initiated and the table is again advanced through 45°.

Although the previous description of the structural and functional features of the illustrated embodiment of the machine have been confined to a description relating to operations being performed on one group of six eggs, it should be understood that the various operations performed at the eight stations described are carried out simultaneously on groups of six eggs each. Accordingly, during operation of the machine and as six eggs are delivered thereto by the conveyor 42, the contents of another group of separated eggs are being discharged at the station 92 and the other described machine operations are being simultaneously performed at the other stations.

In one specific embodiment of the invention, the indexing mechanism is preferably driven by a one horsepower motor 158 through a conventional reducer that provides a variable driving speed for the indexing mechanism of between 20 to 30 revolutions per minute. With a driving rate such as this, the table 10 can be indexed 45° in about one second, whereafter it will pause with the receptacles 14 aligned with the various stations for a period of about two seconds. As a consequence, the separated contents of six eggs will be provided at the discharge station 92 approximately every three seconds yielding an output of 600 dozen eggs per hour.

From the foregoing, it will be appreciated that the present invention provides an egg breaking and separating machine that can effect the large scale production of separated egg contents at a relatively low initial as well as operational cost. Although the principal features of the invention have been fully illustrated and described, the conventional protective support structure and other similar constructional features of the machine which would detract from the clear illustration of the important structural components provided at the various stations have not been illustrated. In this connection, it is obvious that those machine parts which are contacted by or come in contact with the eggs or the egg contents are preferably fabricated of a suitable material such as stainless steel which insures and fulfills the requirements of cleanliness and purity of the separated egg products derived from the machine.

It should be understood that modifications of various of the structural and functional features of the illustrated embodiment of the machine would be obvious to those skilled in the art and would not depart from the invention, various features of which are set forth in the following claims.

What is claimed is:

1. An egg breaking and separating machine having a plurality of spaced apart work stations whereat the delivery of eggs to the machine, the breaking of eggs and the separation of the contents thereof are sequentially effected; which machine comprises a supporting structure; a support table movably mounted on said supporting structure for movement relative to the work stations positioned around said table; at least one egg receiving receptacle mounted on said support table adjacent the peripheral edge thereof; said receptacle including a fixedly mounted upper egg supporting member and a lower dual cup member, said lower dual cup member being mounted on the support table for movement relative to both said table and said upper egg supporting member; means mounted on said supporting structure at a first work station for effecting positioning of an egg within said upper supporting member; means mounted on said supporting structure at a second work station positioned to engage said lower dual cup member and to sequentially raise and lower said member into an upper position to engage the lower portion of an egg in said upper supporting member and into a lower position away from said upper support member; cutting means mounted on said supporting structure at said second work station and positioned to sever an egg in said upper supporting member; actuating means positioned at said second work station so as to be engaged by said dual cup member moving means and thereby actuate said cutting means; means mounted on said supporting structure at a third work station positioned to engage said dual cup member to tip the dual cup member relative to said table; and means mounted on said supporting structure at a fourth work station for effecting the ejection of shells from said receptacle.

2. An egg breaking and separating machine having a plurality of spaced apart work stations whereat the delivery of eggs to the machine, the breaking of eggs and the separation of the contents thereof are sequentially effected; which machine comprises a supporting structure; a support table mounted on said supporting structure for movement relative to the work stations positioned around said table; at least one egg receiving receptacle mounted on said support table adjacent the peripheral edge thereof; said receptacle including a fixedly mounted upper egg supporting member and a lower dual cup member, said lower dual cup member being mounted on the support table for movement relative to both said table and said upper egg supporting member; means mounted on said supporting structure at a first work station for effecting positioning of an egg within said upper supporting member; means mounted on said supporting structure at a second work station positioned to engage said lower dual cup member and to sequentially raise and lower said member into an upper position to engage the lower portion of an egg in said upper supporting member and into a lower position away from said upper supporting member; cutting means mounted on said supporting structure at said second work station and positioned to sever an egg in said upper supporting member; actuating means positioned at said second work station so as to be engaged by said dual cup member moving means and thereby actuate said cutting means; means mounted on said supporting structure at a third work station positioned to engage said dual cup member to tip the dual cup member relative to said table; means mounted on said supporting structure at a fourth work station for effecting the ejection of shells from said receptacle; and indexing drive means connected to said support table, said positioning means, said dual cup member moving means, said tipping means and said ejecting means for effecting the sequential indexing of said receptacle relative to said work stations and the actuation of each of said last mentioned means subsequent to said indexing.

3. In an egg handling machine, apparatus for delivering eggs from an egg supplying conveyor to an egg receiving receptacle mounted on an indexible support table of the machine and including resilient means for maintaining an egg therein; which apparatus comprises means mounted on the machine for movement from a position below the conveyor to a position above the conveyor, said means including a member engageable with an egg on the conveyor whereby an egg is removed from the conveyor and is supported in a plane thereabove; gripping means mounted on the machine for movement along a path terminating at the receiving receptacle and passing through the plane wherein a removed egg is supported by said member; means connected to said gripping means for effecting the controlled advancement thereof along said path and relative to said member so that an egg engaged thereby is gripped and advanced into engagement with the resilient means of the egg receiving receptacle and maintained therein; and means connected to said egg removing and supporting member and to said advancing means for effecting the sequential actuation thereof.

4. In an egg handling machine, apparatus for severing a plurality of eggs having the upper portions thereof confined within a group of egg receiving receptacles mounted in aligned horizontal spaced relation on the machine and for automatically effecting the separation of the contents of the severed eggs; which apparatus comprises a plurality of dual cup members including an upper yolk receiving portion and a lower albumen receiving portion; means movably mounted one each of said dual cup members beneath each of the egg receiving receptacles; egg severing means mounted on the machine for movement along a substantially horizontal plane beneath the receptacles wherein the lower portions of eggs confined therein lies; selectively energizable means connected to said egg severing means for effecting reciprocal movement thereof through said plane; and means mounted on the machine and engageable with said dual cup member mounting means for raising said dual cup members so that the yolk receiving portion of each is positioned in alignment with and in close proximity to the lower portion of an egg confined within the egg receiving receptacle aligned therewith and for lowering said dual cup members, said last mentioned means being engageable with said selectively energizable means when said dual cup members have been raised to effect the energization thereof.

5. An egg breaking and separating machine having a plurality of spaced apart work stations whereat the delivery of eggs to the machine, the breaking of eggs and the separation of the contents thereof are sequentially effected; which machine comprises a supporting structure; a support table movably mounted on said supporting structure for movement relative to the work stations positioned around said table; a plurality of egg receiving receptacles mounted on said support table in spaced relation adjacent the peripheral edge thereof; each of said receptacles including a fixedly mounted upper egg supporting member and a lower dual cup member, said lower dual cup members being mounted on the support table in aligned vertical relation beneath and for movement relative to both said table and the corresponding one of said upper egg supporting members; means mounted on said supporting structure at a first work station for effecting the positioning of eggs supplied to the machine within said upper supporting members; means mounted on said supporting structure at a second work station and engageable with said lower dual cup members for raising said members into a position so as to be aligned with and in close proximity to the lower portions of eggs when positioned within the corresponding upper supporting member and for lowering said members; egg severing means mounted on said supporting structure at said second work station so as to be actuated by said dual cup member moving means and effect the severance of eggs when positioned within the upper supporting members; means mounted on said supporting structure at a third work station and engageable with said lower dual cup members for effecting the pivoting thereof relative to said table; means mounted on said supporting structure at a fourth work station for effecting the ejection of shells from said receptacles; and indexing drive means connected to said support table and said positioning means, said dual cup member moving means, said pivoting means, and said ejecting means for effecting the sequential indexing of said receptacles relative to said work stations and the concomitant actuation of each of said last mentioned means subsequent to said indexing.

6. An egg breaking and separating machine having a plurality of spaced apart work stations whereat the delivery of eggs to the machine, the breaking of eggs and the separation of the contents thereof are sequentially effected; which machine comprises a supporting structure; a support table mounted on said supporting structure for movement relative to the work stations positioned around said table; at least one egg receiving receptacle mounted on said support table adjacent the peripheral edge thereof; said receptacle including a fixedly mounted upper egg supporting member including resilient means for maintaining an egg therein and a lower dual cup member, said lower dual cup member being mounted on the support table for movement relative to both said table and said upper egg supporting member; conveyor means mounted on said supporting structure at a first work station for delivering eggs to the machine; means mounted at said first work station for movement from a position below the conveyor means to a position above the conveyor means, said last mentioned means including a member engageable with an egg on the conveyor means whereby an egg is removed from the conveyor means and is supported in a plane thereabove; gripping means mounted at said first work station for movement along a path terminating at the receiving receptacle and passing through the plane wherein a removed egg is supported by said member; means connected to said gripping means for effecting the controlled advancement thereof along said path and relative to said member so that an egg engaged thereby is gripped and advanced into engagement with the resilient means of the egg receiving receptacle and maintained therein; means mounted on said supporting structure at a second work station positioned to engage said lower dual cup member and to sequentially raise and lower said member into an upper position to engage the lower portion of an egg maintained in said upper supporting member by said resilient means and into a lower position away from said upper supporting member; cutting means mounted on said supporting structure at said second work station and positioned to sever an egg in said upper supporting member; actuating means positioned at said second work station so as to be engaged by said dual cup member moving means and thereby actuate said cutting means; means mounted on said supporting structure at a third work station positioned to engage said dual cup member to tip the dual cup member relative to said table; and means mounted on said supporting structure at a fourth work station for effecting the ejection of shells from said receptacle.

7. An egg breaking and separating machine having a plurality of spaced apart work stations whereat the delivery of eggs to the machine, the breaking of eggs and the separation of the contents thereof are sequentially effected; which machine comprises a supporting structure; a support table movably mounted on said supporting structure for movement relative to the work stations positioned around said table; a plurality of egg receiving receptacles mounted on said support table in spaced relation adjacent the peripheral edge thereof; each of said receptacles including a fixedly mounted upper egg supporting member and a lower dual cup member, said lower dual cup members having an upper yolk receiving portion and a lower albumen receiving portion and being mounted on the support table in aligned vertical relation beneath and for movement relative to both said table and the corresponding one of said upper egg supporting members; means mounted on said supporting structure at a first work station for effecting the positioning of eggs supplied to the machine within said upper supporting members so that the lower portions of eggs so positioned lie in a plane beneath said upper supporting members; egg severing means mounted at a second work station for movement through the plane beneath the upper supporting members wherein the lower portions of eggs confined therein lie; selectively energizable means connected to said egg severing means for effecting reciprocal movement thereof through said plane; means mounted at said second work station and engageable with said dual cup member mounting means for raising said dual cup members so that the yolk receiving portion of each is positioned in alignment with and in close proximity to the lower portion of an egg confined within the supporting member aligned therewith and for lowering said dual cup members, said last mentioned means being engageable with said selectively energizable means when said dual cup members have been raised to effect the energization thereof; means mounted on said supporting structure at a third work station and engageable with said lower dual cup members for effecting the pivoting thereof relative to said table; means mounted on said supporting structure at a fourth work station for effecting the ejection of shells from said receptacles; and indexing drive means connected to said support table and said positioning means, said dual cup moving means, said pivoting means, and said ejecting means for effecting the sequential indexing of said receptacles relative to said work stations and the concomitant actuation of each of said last mentioned means subsequent to said indexing.

References Cited in the file of this patent

UNITED STATES PATENTS

| | | |
|---|---|---|
| 1,560,053 | Harkin | Nov. 3, 1925 |
| 1,747,432 | Eskholme | Feb. 18, 1930 |
| 1,850,151 | Kinney | Mar. 22, 1932 |
| 2,443,188 | Hodson | June 15, 1948 |
| 2,524,844 | Smith | Oct. 10, 1950 |